: 3,429,948
POLYESTERURETHANE ELASTOMERS
VULCANIZABLE IN LIVE STEAM
Jean-Marie Massoubre, Clermont-Ferrand, France, assignor to Compagnie General des Etablissements Michelin Raison Sociale Michelin & Cie, Clermont-Ferrand, France
No Drawing. Filed Dec. 20, 1965, Ser. No. 515,196
Claims priority, application France, Dec. 22, 1964,
1,816
U.S. Cl. 260—859    5 Claims
Int. Cl. C08g 41/04, 53/00

ABSTRACT OF THE DISCLOSURE

A process for preparing an open steam-cured polyesterurethane vulcanizate without substantial hydrolytic degradation which comprises heating a vulcanizable polyesterurethane elastomer composition containing a polyesterurethane elastomer vulcanizable by an organic peroxide, a polymer compatible therewith which is cross-linkable by an organic peroxide and an organic peroxide vulcanizing agent by direct contact with live steam.

---

The present invention pertains to polyesterurethane elastomers, and more particularly to a vulcanizable polyesterurethane elastomer composition capable of being vulcanized in live steam without hydrolytic degradation, a process for vulcanizing the same by open steam curing and the resulting unhydrolyzed vulcanizate.

Although polyetherurethane elastomers are not subject to hydrolytic degradation by live steam, the polyesterurethane elastomers are very sensitive to hydrolysis, especially at the temperatures at which their vulcanization is undertaken. As a result, it is not possible to vulcanize, cure or cross-link mixtures of polyesterurethanes in live steam, i.e., in direct contact with water vapor, except under protection, for example, in a mold or by using some other kind of steam-tight cover.

The impossibility of vulcanization in live steam of polyesterurethane mixtures constitutes a burdensome condition which in practice eliminates the use of these elastomers in the manufacture of certain articles, in spite of their desirable physical and chemical qualities.

Accordingly, it is the object of the present invention to provide (1) vulcanizable polyesterurethane elastomer compositions which are capable of being vulcanized in live steam without substantial hydrolytic degradation, (2) a process for their vulcanization by open steam curing, and (3) the resulting substantially unhydrolyzed vulcanizate.

Surprisingly, it has now been found that polyesterurethane elastomers can be obtained which are capable of vulcanization in live steam and which furnish vulcanizates preserving the desirable qualities of polyesterurethane vulcanizates, especially the latter's physical properties and their resistance to chemical and atmospheric agents, such as ozone.

These results are obtained in accordance with the present invention by combining the polyesterurethane elastomer in a vulcanizable mixture with another polymeric compound compatible with the polyesterurethane and capable of participating, under the influence of the same cross-linking agent, in the same cross-linked network together with the polyesterurethane.

More particularly, the vulcanizable polyesterurethane elastomer composition capable of being vulcanized in direct contact with live stem without substantial hydrolytic degradation comprises a polyesterurethane elastomer vulcanizable by an organic peroxide, another polymeric compound compatible therewith and cross-linkable by an organic peroxide, and an organic peroxide vulcanizing agent therefor.

The polyesterurethane elastomers vulcanizable by an organic peroxide are conventional materials fully described in the technical literature, for example, in U.S. Patents Nos. 3,100,759 and 3,219,663.

The term "another polymeric compound compatible with the polyesterurethane" means a polymer which is intimately mixable with the polyesterurethane, which supposes that, at the molecular scale, no repulsion occurs between the polymer molecules and the polyesterurethane molecules. This is equivalent to saying that the polymer should be polar, as the polyesterurethane is. Polarity, of course, requires the presence in the hydrocarbon chain of groups or atoms, such as halide, which cause a dissymmetry in the molecule. Such polymers compatible with the polyesterurethane elastomers include, by way of example, the well known vinyl acetate-ethylene copolymers, chlorinated polyethylene, polychloroprene or neoprene and butadiene-acrylonitrile copolymer. A preferred copolymer of vinyl acetate and ethylene contains from about 15% to about 35% by weight of vinyl acetate monomer units and from about 85% to about 65% by weight respectively of ethylene monomer units and has a molecular weight of from about 40,000 to about 120,000. A preferred chlorinated polyethylene contains at least about 30% by weight of chlorine fixed to the chain. Neoprene or polychloroprene is a well known elastomer which contains a constant ratio of chlorine (about 40%). A preferred copolymer of butadiene and acrylonitrile contains from about 50% to about 75% by weight of butadiene monomer units and from about 50% to about 25% by weight respectively of acrylonitrile monomer units.

The mixture of polyesterurethane elastomer and compatible polymer contains a weight ratio of from about 90:10 to about 50:50 of the polyesterurethane elastomer to the compatible polymer.

The organic peroxide vulcanizing agents are also conventional materials and include by way of example dicumyl peroxide, di-tertiary butyl peroxide, 2,5-bis(tertiary butyl peroxy)-2,5-dimethylhexane, tertiary butyl cumyl peroxide, n-butyl 4,4-bis(tertiary butylperoxy) valerate and 2,5-bis(tertiary butylperoxy)-2,5-dimethylhexyne-3. In general, from about 0.5 part to about 5 parts by weight of the organic peroxide vulcanizing agent per 100 parts by weight of the mixture of polyesterurethane elastomer and compatible polymer are employed.

In addition to the above three essential components of the vulcanizable composition, there may also be used therein other conventional compounding agents, such as fillers. The term "fillers," as used herein, includes fillers, diluents, reinforcing pigments, colorants, and the like, such as carbon black, titanium dioxide, silica, calcium carbonate, silicon dioxide, calcium silicate, clays, talc, zinc oxide, organic dyes and the like. When employed, these fillers are generally used in varying amounts from about 10 parts to about 100 parts by weight thereof per 100 parts by weight of the mixture of polyesterurethane elastomer and compatible polymer.

In the process of the invention for preparing open steam-cured vulcanizates from the above described polyesterurethane elastomer composition, the composition is heated by direct contact, rather than by indirect contact, with live steam. The heat treatment is generally conducted at a temperature from about 130° C. to about 200° C. for from about 1 minute to about 60 minutes. It will be appreciated that the higher the temperature the shorter the heat treatment.

The following examples are given by way of illustration of the invention not by way of limitation thereof.

Example I

Various polyesterurethane elastomer compositions A through F were prepared by blending together the following components: 100 parts by weight of a mixture of a polyesterurethane elastomer vulcanizable with an organic peroxide obtained in accordance with Example VII of French Patent 1,237,909 and a vinyl acetate-ethylene copolymer (Levaprene 450 which is a vinyl acetate-ethylene copolymer containing 45% by weight vinyl acetate monomer units and having an estimated molecular weight in the range of 40,000 to 120,000), 0.3 parts by weight of stearic acid, 30 parts by weight of furnace black (Regal 300), and 5 parts by weight of 40% dicumyl peroxide (Di-Cup).

The weight ratios of polyesterurethane to copolymer in Compositions A through F were as follows:

| Composition | A | B | C | D | E | F |
|---|---|---|---|---|---|---|
| Polyesterurethane | 100 | 90 | 80 | 70 | 60 | 50 |
| Copolymer | | 10 | 20 | 30 | 40 | 50 |

These six compositions were vulcanized in a mold for 30 minutes at 155° C. as well as in direct contact with live steam for 30 minutes at 155° C. The resulting vulcanizates had the physical properties set forth in the table below.

| Composition | A | B | C | D | E | F |
|---|---|---|---|---|---|---|
| (1) Cured in the mold: | | | | | | |
| Resistance to rupture (kg./cm.²) | 360 | 301 | 267 | 237 | 232 | 223 |
| Elongation at rupture (percent) | 400 | 420 | 425 | 425 | 430 | 455 |
| Shore hardness | 71 | 74 | 75 | 76 | 74 | 74 |
| (2) Cured in live steam: | | | | | | |
| Resistance to rupture (kg./cm.²) | | 245 | 238 | 229 | 219 | 237 |
| Elongation at rupture (percent) | | 457 | 478 | 488 | 491 | 489 |
| Shore hardness | | 70 | 70 | 70 | 70 | 70 |

The above comparative data establish that the physical properties for all the vulcanizates B, C, D, E and F were substantially the same in mold curing and in open steam curing. This proves that direct contact with the steam did not bring about any appreciable deterioration thereof. These vulcanizates were technically excellent. In contrast thereto, Vulcanizate A, which did not contain a compatible polymer was unusable, was decomposed by the steam, was sticky on the surface and was without all resistance to rupture. This was due to hydrolysis of the polyesterurethane elastomer.

Example II

It is also possible to obtain a white or colored open steam-cured polyesterurethane vulcanizate having the same resistance to hydrolysis as the above Vulcanizates B through F of Example I containing carbon black. There was blended together 100 parts by weight of a 70:30 mixture of the polyesterurethane and vinyl acetate-ethylene copolymer of Example I, 0.3 part by weight of stearic acid, 30 parts by weight of ultra-fine silica, 6 parts by weight of 40% dicumyl peroxide and 30 parts by weight of titanium dioxide (or a dye in a quantity sufficient to obtain the desired coloring).

There was obtained the following results when this blend was vulcanized at 155° C. for 30 minutes:

| | Vulcanization in mold | Vulcanization in live steam |
|---|---|---|
| Resistance to rupture (kg./cm.²) | 310 | 282 |
| Elongation at rupture (percent) | 512 | 495 |
| Shore hardness | 74 | 76 |
| Module at 300% elongation | 63 | 54 |

Example III

There was blended together a mixture consisting of 70 parts by weight of the polyesterurethane of Example I, 30 parts by weight of chlorinated polyethylene with 35% chlorine content (PLT C D84 of Solvay & Cie.), 0.3 part by weight of stearic acid, 30 parts by weight of furnace black (Regal 300) and 6.5 parts by weight of 40% dicumyl peroxide.

With this mixture, there was obtained the following results when it was vulcanized for 30 minutes at 155° C.:

| | Vulcanization in mold | Vulcanization in live steam |
|---|---|---|
| Resistance to rupture (kg./cm.²) | 241 | 210 |
| Elongation at rupture (percent) | 450 | 350 |
| Shore hardness | 71 | 70 |

As in the preceding Example II, the mixture of Example III suffers only a slight deterioration of its qualities when vulcanized in direct contact with live steam instead of in a mold.

Example IV

Three polyesterurethane elastomer compositions A, B, C, were prepared by blending together the following components: 100 parts by weight of a mixture of the polyesterurethane of Example I and of polychloroprene having a molecular weight of about 100,000 and a chlorine content of about 40% by weight (Neoprene GN of Du Pont de Nemours), 0.3 part by weight of stearic acid, 30 parts by weight of furnace black (Regal 300), and 5 parts by weight of 40% dicumyl peroxide (Di-Cup).

The weight ratios of polyesterurethane to poly-chloroprene in these three compositions were as follows:

| Composition | A | B | C |
|---|---|---|---|
| Polyesterurethane | 80 | 70 | 60 |
| Polychloroprene | 20 | 30 | 40 |

These three compositions were vulcanized either in a mold for 30 minutes at 155° C. or in direct contact with live steam for 12 minutes at 165° C. The resulting vulcanizates had the physical properties set forth in the table below:

| Composition | A | B | C |
|---|---|---|---|
| (1) Cured in the mold: | | | |
| Resistance to rupture (kg./cm.²) | 205 | 152 | 125 |
| Elongation at rupture (percent) | 580 | 470 | 350 |
| Shore hardness | 60 | 56 | 55 |
| (2) Cured in live steam: | | | |
| Resistance to rupture (kg./cm.²) | 158 | 115 | 105 |
| Elongation at rupture (percent) | 495 | 335 | 210 |
| Shore hardness | 55 | 54 | 51 |

The above data show that the physical properties were not deteriorated considerably by live steam curing, especially when the amount of polychloroprene added to the polyesterurethane is low.

Example V

The same test was made as in Example IV, except that a butadiene-acrylonitrile rubber, specifically Hycar 1052 of Goodrich, was substituted for the polychloroprene, the same recipes for compounding and the same curing conditions being used.

The resulting vulcanizates had the physical property set forth in the table below:

| Composition | A | B | C |
|---|---|---|---|
| (1) Cured in the mold: | | | |
| Resistance to rupture (kg./cm.²) | 265 | 240 | 212 |
| Elongation at rupture (percent) | 370 | 340 | 320 |
| Shore hardness | 70 | 67 | 65 |
| (2) Cured in live steam: | | | |
| Resistance to rupture (kg./cm.²) | 185 | 130 | 105 |
| Elongation at rupture (percent) | 325 | 265 | 230 |
| Shore hardness | 57 | 54 | 53 |

A low amount of polymer added to the polyesterurethane, as in Example IV, appeared to be preferable.

Of course, it is possible without exceeding the scope of the invention to add to the polyesterurethane several compounding agents in accordance with the invention, or also to incorporate into the mixture in accordance with the invention other elastomers compatible with the poly-

What is claimed is:

1. A process for preparing an open steam-cured polyesterurethane vulcanizate without substantial hydrolytic degradation which comprises heating a vulcanizable polyesterurethane elastomer composition consisting essentially of 100 parts by weight of a mixture of (1) a polyesterurethane elastomer vulcanizable by an organic peroxide and (2) a polymer compatible therewith which is crosslinkable by an organic peroxide and which is selected from the group consisting of a vinyl acetate-ethylene copolymer, a chlorinated polyethylene, a polychloroprene and a butadiene-acrylonitrile copolymer, the weight ratio of the polyesterurethane to the polymer compatible therewith being from about 90:10 to about 50:50; and from about 0.5 part to 5 parts by weight of an organic peroxide vulcanizing agent therefor, by direct contact with live steam at a temperature from about 130° C. to about 200° C. from about 1 minute to about 60 minutes.

2. The process as defined by claim 1 wherein the compatible polymer is a vinyl acetate-ethylene copolymer containing from about 15% to about 35% by weight of vinyl acetate monomer units and from about 85% to about 65% by weight respectively of ethylene monomer units and having a molecular weight of from about 40,000 to about 120,000.

3. The process as defined by claim 1 wherein the compatible polymer is a chlorinated polyethylene containing at least about 30% by weight of chlorine fixed to the chain.

4. The process as defined by claim 1 wherein the compatible polymer is a polychloroprene having a molecular weight of about 100,000 and a chlorine content of about 40% by weight.

5. The process as defined by claim 1 wherein the compatible polymer is a butadiene-acrylonitrile copolymer containing from about 50% to about 75% by weight of butadiene monomer units and from about 50% to about 25% by weight respectively of acrylonitrile monomer units.

References Cited

UNITED STATES PATENTS

| | | | |
|---|---|---|---|
| 2,993,013 | 7/1961 | Wolfe | 260—859 |
| 3,012,987 | 12/1961 | Ansul | 260—858 |
| 3,100,759 | 8/1963 | Boussu et al. | 260—77.5 |
| 3,219,633 | 11/1965 | Boussu et al. | 260—77.5 |
| 3,225,007 | 12/1965 | Gruber et al. | 260—40 |
| 3,305,503 | 2/1967 | Russell | 260—859 |

FOREIGN PATENTS

| | | |
|---|---|---|
| 149,056 | 11/1952 | Australia. |
| 644,829 | 10/1950 | Great Britain. |

MORRIS LIEBMAN, *Primary Examiner.*

B. A. AMERNICK, *Assistant Examiner.*

U.S. Cl. X.R.

260—23, 23.7, 40